(12) United States Patent
Fu

(10) Patent No.: US 10,270,498 B2
(45) Date of Patent: Apr. 23, 2019

(54) MIMO DETECTOR DEVICE USEFUL FOR AUTOMATED VEHICLES

(71) Applicant: APTIV TECHNOLOGIES LIMITED, St. Michael (BB)

(72) Inventor: Kan Fu, Kokomo, IN (US)

(73) Assignee: Aptiv Technologies Limited (BB)

( * ) Notice: Subject to any disclaimer, the term of this patent is extended or adjusted under 35 U.S.C. 154(b) by 0 days.

(21) Appl. No.: 15/700,721

(22) Filed: Sep. 11, 2017

(65) Prior Publication Data

US 2019/0081663 A1 Mar. 14, 2019

(51) Int. Cl.
*H04B 7/04* (2017.01)
*H04B 7/0413* (2017.01)
*G01S 13/28* (2006.01)
*H04B 7/08* (2006.01)

(52) U.S. Cl.
CPC .......... *H04B 7/0413* (2013.01); *G01S 13/284* (2013.01); *H04B 7/08* (2013.01)

(58) Field of Classification Search
CPC ...... H04B 7/0413; H04B 7/08; G01S 13/0413
See application file for complete search history.

(56) References Cited

U.S. PATENT DOCUMENTS

2011/0286497 A1* 11/2011 Nervig .................. H04L 5/0021
375/147
2015/0160331 A1 6/2015 Lynch

FOREIGN PATENT DOCUMENTS

WO 2017/187278 A1 11/2017

OTHER PUBLICATIONS

European Search Report dated Jan. 14, 2019.

* cited by examiner

*Primary Examiner* — Kabir A Timory
(74) *Attorney, Agent, or Firm* — Lawrence D Hazelton

(57) ABSTRACT

An illustrative example embodiment of a detector device includes a receiver configured to receive radiation comprising a plurality of codes. Each of the codes is associated with one of a plurality of transmissions and each of the codes is distinct from the other codes. A processor is configured to obtain information corresponding to at least one predetermined phase code spectrum for the codes, determine a demodulated signal spectrum of radiation received by the at least one receiver, determine at least one characteristic of the determined demodulated signal spectrum, adjust the at least one predetermined phase code spectrum based on the determined characteristic to generate an adjusted phase code spectrum, and refine the determined demodulated signal spectrum based on the adjusted phase code spectrum to generate a refined demodulated signal spectrum.

18 Claims, 4 Drawing Sheets

MIMO DETECTOR DEVICE USEFUL FOR AUTOMATED VEHICLES

BACKGROUND

Innovations in electronics and technology have made it possible to incorporate a variety of advanced features on automotive vehicles. Various sensing technologies have been developed for detecting objects or monitoring the surroundings in a vicinity or pathway of a vehicle. Such systems are useful for parking assist, lane departure detection and cruise control adjustment features, for example.

More recently, automated vehicle features have become possible to allow for autonomous or semi-autonomous vehicle control. Sensors for such systems may incorporate LIDAR (light detection and ranging) or RADAR for detecting an object or another vehicle in the pathway of or otherwise near the vehicle. Depending on the approach speed, the cruise control setting may be automatically adjusted to reduce the speed of the vehicle based on detecting another vehicle in the pathway of the vehicle, for example.

One proposal to improve such sensing technologies includes using a multiple-input-multiple-output (MIMO) signaling technique that includes multiple, simultaneous signal transmissions. There are known ways to modulate such signals so that the different signals can be distinguished from each other at a receiver. One modulation technique includes a distinct modulation code for each signal. The codes allow for distinguishing the different signals from each other at the receiver in a known manner.

One difficulty introduced by MIMO techniques is the residue or noise associated with the multiple signal reception. Such residue reduces the signal-to-noise ratio and decreases the dynamic range of the device or system. It would be useful to be able to reduce the effect of such residue so that the other advantages of MIMO techniques can be realized with an automotive sensing device. Previously proposed approaches to removing or reducing the effects of such residue tend to be too computationally expensive and require too much processor capacity to be included on automotive vehicles.

SUMMARY

An illustrative example embodiment of a detector device includes a receiver configured to receive radiation comprising a plurality of codes. Each of the codes is associated with one of a plurality of transmissions and each of the codes is distinct from the other codes. A processor is configured to obtain information corresponding to at least one predetermined phase code spectrum for the codes, determine a demodulated signal spectrum of radiation received by the at least one receiver, determine at least one characteristic of the determined demodulated signal spectrum, adjust the at least one predetermined phase code spectrum based on the determined characteristic to generate an adjusted phase code spectrum, and refine the determined demodulated signal spectrum based on the adjusted phase code spectrum to generate a refined demodulated signal spectrum.

An illustrative example method of detecting includes receiving radiation comprising a plurality of codes that are distinct from each other and determining a demodulated signal spectrum of the received radiation. There is at least one predetermined phase code spectrum for the codes. The method includes determining at least one characteristic of the determined demodulated signal spectrum, adjusting the predetermined phase code spectrum based on the determined characteristic to generate an adjusted phase code spectrum, and refining the determined demodulated signal spectrum based on the adjusted phase code spectrum to generate a refined demodulated signal spectrum.

Various features and advantages of at least one disclosed embodiment will become apparent to those skilled in the art from the following detailed description. The drawings that accompany the detailed description can be briefly described as follows.

DETAILED DESCRIPTION

Embodiments of this invention include detector devices that provide an ability to remove residue or noise from received radiation including a plurality of codes used for MIMO transmissions. Such devices are useful for a variety of vehicle applications, such as detectors on automated vehicles or semi-autonomous vehicles. Such detectors are also useful for assisting drivers of automotive vehicles.

Figure 1:
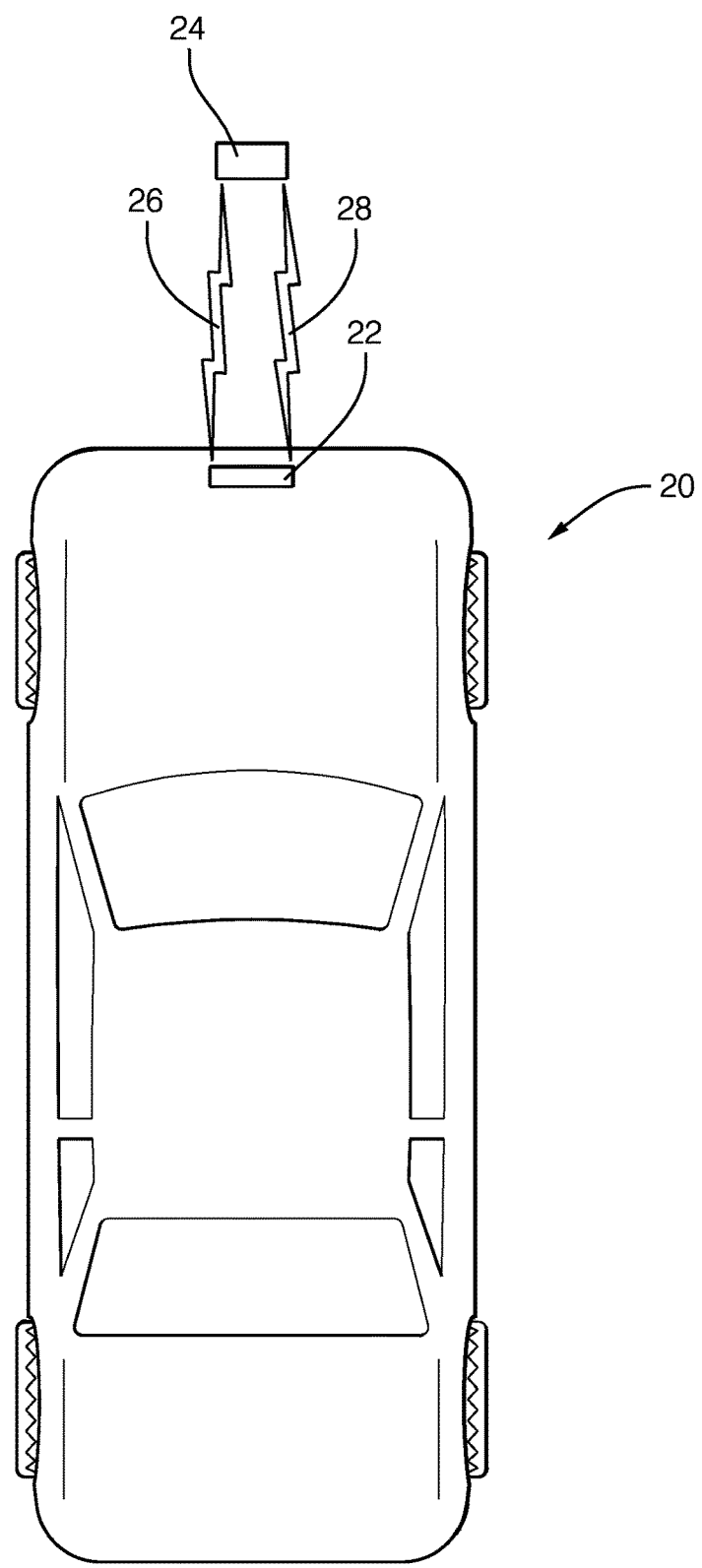
FIG. 1 schematically illustrates a vehicle including detector devices designed according to an embodiment of this invention.

FIG. 1 schematically illustrates an example vehicle 20 including a detector device 22 that is configured for use with MIMO transmission or signaling techniques. In some examples, the detector device 22 is capable of detecting RADAR radiation that is reflected off at least one object 24 in the vicinity or path of the vehicle 20. Two objects 24A and 24B are illustrated in FIG. 1. The transmitted radiation is schematically illustrated at 26 and the reflected wave or radiation is shown at 28. The transmitted and detected radiation may be considered signals or waves, for example.

Figure 2:
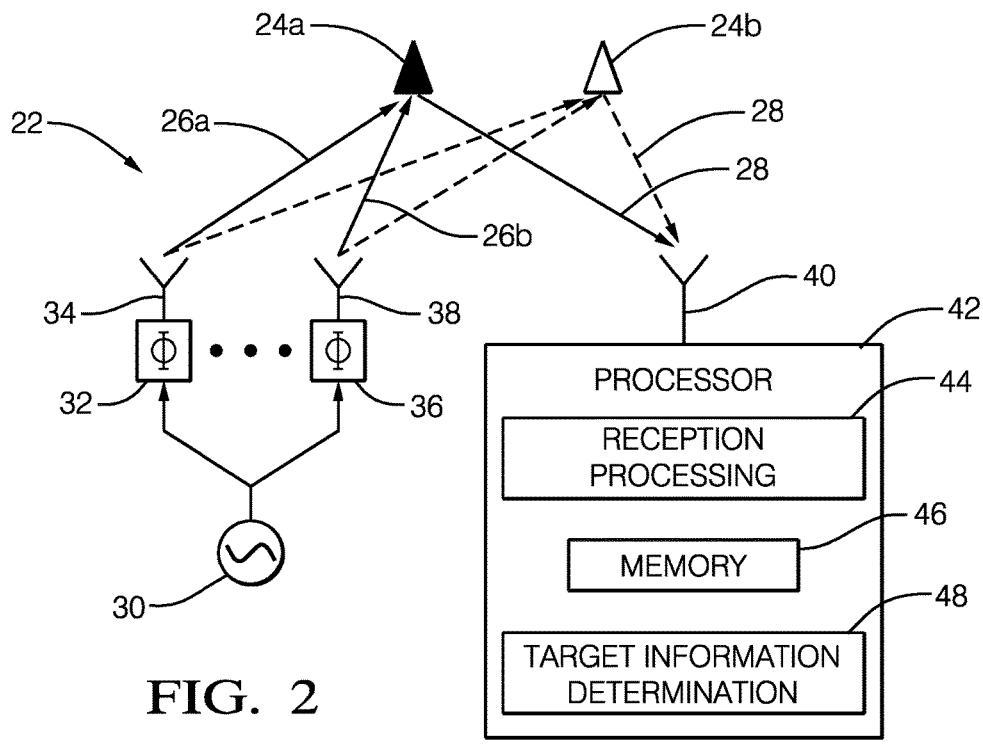
FIG. 2 schematically illustrates selected components of an example detector device designed according to an embodiment of this invention.

FIG. 2 schematically illustrates an example configuration of the detector device 22. In this example, the detector device 22 has components for transmitting and receiving radiation. Some embodiments do not include the transmitting components as part of the detector device 22 but, instead, have separate transmitting and receiving or detecting devices.

A radiation generator 30 provides or produces radiation, such as RADAR. A first modulation module 32 modulates the radiation by applying or inserting a first modulation code into radiation emitted by a first transmitter element 34, such as an antenna. A second modulation module 36 modulates the radiation by applying or inserting a second modulation code into radiation emitted by a second transmitter element 38, which comprises an antenna in this example. The first and second modulation codes effectively establish first and second transmissions 26A, 26B that are distinguishable from each other by demodulating or otherwise recognizing the respective codes of the transmissions. While two transmitter elements and two codes are included in the illustration, more than two are useful in many embodiments. Each modulation code is distinct from other codes used for transmissions from the device 22.

The device 22 includes at least one receiver element 40, such as an antenna, that receives or detects the reflected radiation 28 that includes a reflection of the first transmission 26A and the second transmission 26B from each of the objects 24. The received or detected radiation includes the first and second modulation codes. A processor 42 includes a reception processing module 44 that includes programming that configures the processor 42 to be able to discern between the modulation codes in the received radiation and to otherwise process the received radiation according to this description.

A memory 46 contains information regarding at least one predetermined phase code spectrum for the plurality of codes used by the device 22. In some examples, the memory 46 includes a unique phase code spectrum for each code that may be used for transmissions 26. In some examples, the predetermined phase code spectrum is based on more than one code using a known combination technique.

Although the memory 46 is schematically shown as part of the processor 42 in the illustration, the memory 46 need not be physically part of the processor 42. In some embodiments the memory 46 comprises components that are separate or distinct from components of the processor 42. In such examples, the processor 42 has access to the memory 46 to obtain the predetermined phase code spectrum information as needed by the processor 42.

In some embodiments the phase codes spectrum is determined in real time by the processor 42. There may not be any requirement for a memory to store phase code spectrum information on an ongoing basis in such embodiments.

A target information determination module 48 includes programming that configures the processor 42 to be able to determine information regarding an object, such as the object 24. The information regarding such an object may be a location of the object, a direction of movement of the object, a speed of movement of the object relative to the vehicle 20, or a combination of those.

The processor 42 may be a dedicated processor having its own components used exclusively to perform the functions of the processor 42 described in this document. In some embodiments the processor 42 is part of a controller or processor that is used for other features or purposes on the vehicle 20. The processor 42 is schematically illustrated as a single device but some embodiments include a processor realized through the functionality of components or software associated with a plurality of devices. The processor in this example includes at least one computing device configured to make the determinations described in this document and suitable programming for those purposes.

Figure 3:
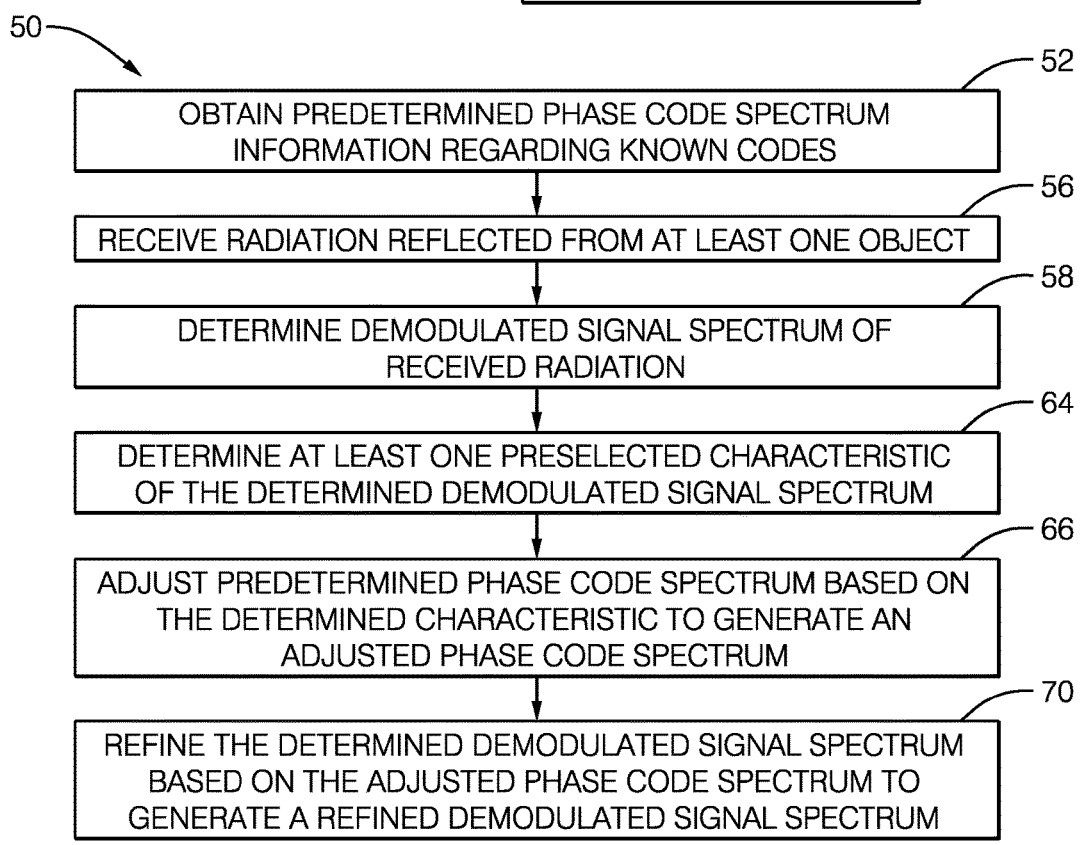
FIG. 3 is a flowchart diagram summarizing an example detecting method according to an embodiment of this invention.
Figure 4:
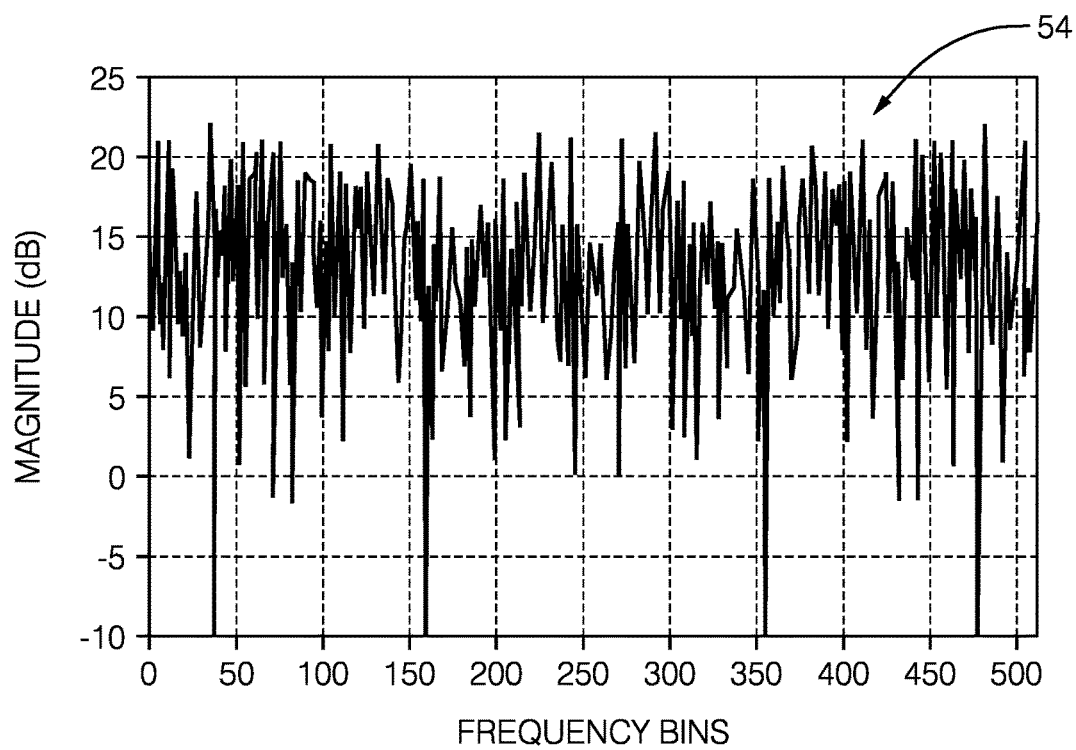
FIG. 4 schematically illustrates a phase code spectrum of a modulation code.

FIG. 3 is a flowchart diagram 50 that summarizes an example detecting method designed according to an embodiment of this invention. The example method begins at 52 where the processor 42 obtains information regarding the predetermined phase code spectrum information, which may be accomplished by accessing such information stored in the memory 46 or by determining the phase code spectrum in real time. FIG. 4 includes a plot 54 representing an example phase code spectrum for one of the plurality of known codes. The memory 46 in this example includes information sufficient to allow the reception processing module 44 to use the relevant aspects of the predetermined phase code spectrum. Those skilled in the art who have the benefit of this description will realize what aspects of the phase code spectrum should be stored in memory or determined in real time to meet the needs of their particular implementation. In some examples, the predetermined phase code spectrum will be based on more than one of the plurality of known codes.

At 56 in FIG. 3, radiation is received or detected by the receiver element 40 after that radiation reflected off the object 24. In some instances the received radiation will not necessarily be reflected off an object although in a RADAR implementation as schematically shown, the reflected radiation provides the information needed for the target information determination module 48 to provide the desired information regarding an object of interest.

Figure 5:
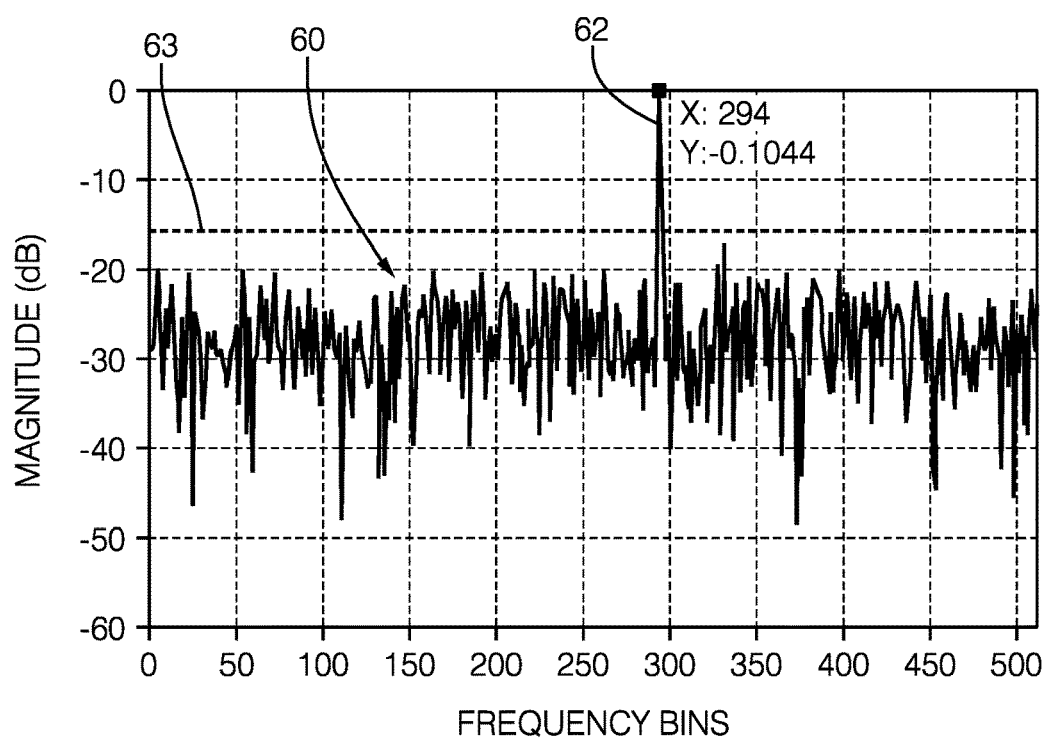
FIG. 5 schematically illustrates a demodulated signal spectrum of received radiation including at least two modulation codes and residue.

At 58 the demodulated signal spectrum of the received radiation is determined by the reception processing module 44 of the processor 42. FIG. 5 includes a plot 60 of such a demodulated signal spectrum. In this example, the demodulated signal spectrum includes a plurality of peaks but only one peak at 62 has a magnitude that exceeds a preselected threshold 63.

At 64 the processor 42 determines at least one characteristic of the demodulated signal spectrum shown at 60. In this example, the characteristic is based on the peak 62. In particular, the characteristic in this example includes information regarding the peak such as the complex amplitude of the spectrum plot at the peak 62 and the frequency at which the peak 62 occurs.

Figure 6:
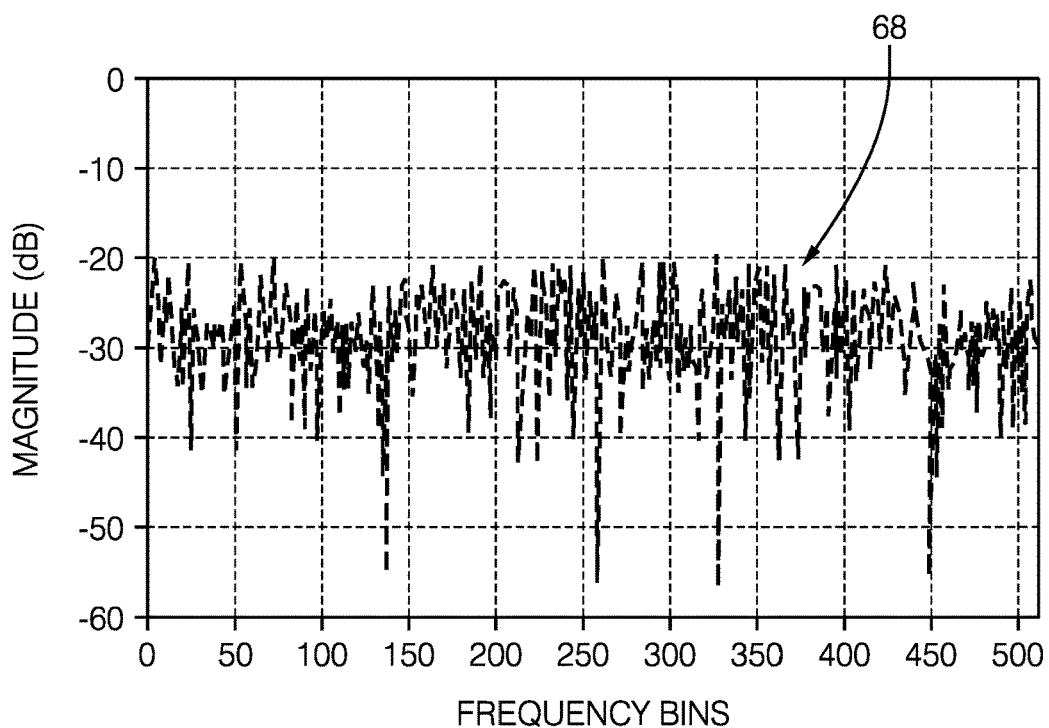
FIG. 6 schematically illustrates an adjusted phase code spectrum corresponding to the phase code spectrum of FIG. 4 adjusted based on information from the demodulated signal spectrum of FIG. 5.

The processor adjusts the predetermined phase code spectrum at 66. The adjustment is based on the determined characteristic of the determined demodulated signal spectrum 60 of the received radiation. In this embodiment, the predetermined phase code spectrum is shifted by an amount corresponding to the frequency at which the peak 62 occurs. The shifted spectrum is multiplied by the corresponding complex amplitude. A result of the adjustment is shown at 68 in FIG. 6 and can be referred to as an adjusted phase code spectrum. The adjusted phase code spectrum 68 corresponds to the residue in the received radiation, which is caused by the reflection from the objects 24.

Where there are multiple codes in the received radiation and there is one predetermined phase code spectrum for each code in the memory 46, the processor 42 determines an adjusted phase code spectrum for each code and determines a sum of the adjusted spectrums to estimate the residue. That residue estimate is then used as the adjusted phase code spectrum for refining the determined demodulated signal spectrum of the received radiation at 70 in FIG. 3.

The reception processing module 44 of the processor 42 refines the determined demodulated signal spectrum at 70 based on the adjusted phase code spectrum to generate a refined demodulated signal spectrum. In this example, the adjusted phase code spectrum is subtracted from the determined demodulated signal spectrum resulting in a refined demodulated signal spectrum as represented by the plot 72 in FIG. 7. Subtracting the adjusted phase code spectrum from the determined demodulated signal spectrum effectively removes the residue from the received radiation.

Figure 7:
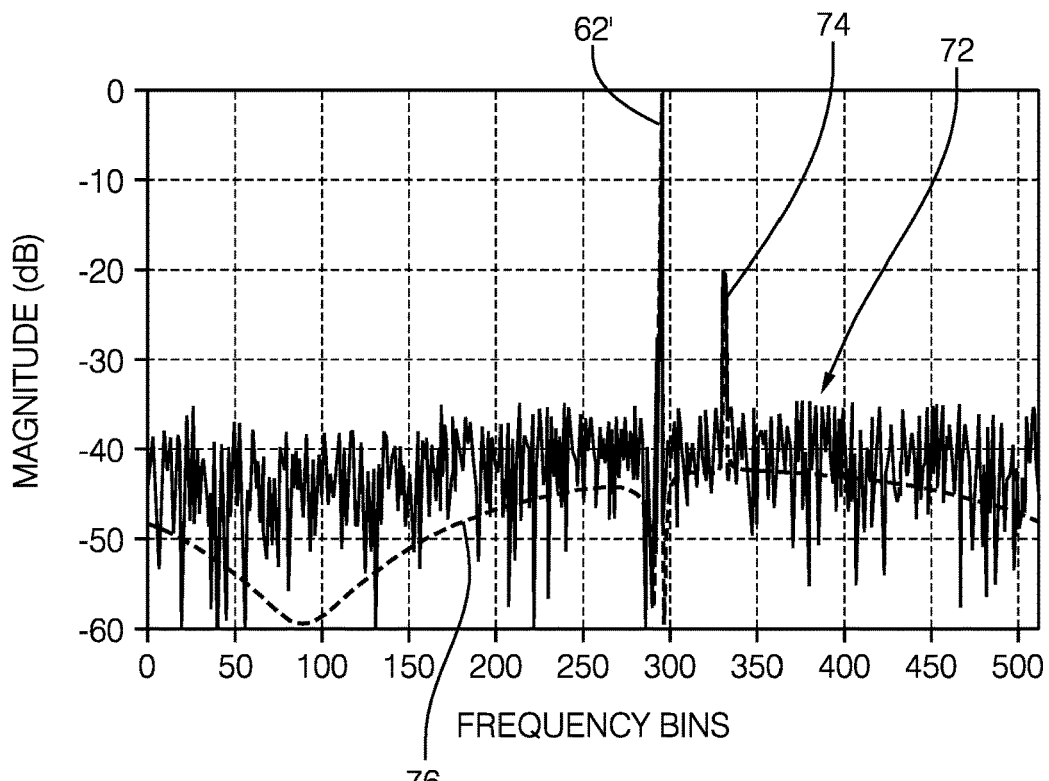
FIG. 7 schematically illustrates a refined demodulated signal spectrum that is based on the demodulated signal spectrum of FIG. 5 and the adjusted phase code spectrum of FIG. 6.

As can be appreciated from FIG. 7, the peak 62' is more pronounced than the peak 62 in FIG. 5. Additionally, a second peak 74 corresponding to the second object 24B from which the received radiation reflected is discernable in FIG. 7 because the residue, which effectively masked the second peak 74 in the demodulated signal spectrum 60 of FIG. 5, has been removed.

FIG. 7 also includes a dashed line plot 76 representing a result if a single signal transmission were reflected from the objects 24 without using a MIMO technique. FIG. 7 demonstrates how well the example detecting technique addresses the problems or complications introduced by the residue associated with MIMO reception and allows for identifying characteristics of received or detected radiation for obtaining information regarding an object in the vicinity or pathway of the vehicle 20. The example device and process makes it possible to enjoy the benefits or advantages of MIMO techniques while maintaining a desired signal-to-noise ratio and dynamic range.

The process summarized in FIG. 3 includes a single iteration of refining the determined demodulated signal spectrum of the received radiation. Some embodiments include multiple iterations in which the adjusting and refining portions of the process are repeated to further refine the determined demodulated signal spectrum. Using multiple iterations increases accuracy in estimating the residue and identifying information or characteristics of an object such as the objects 24A and 24B in at least some cases.

The disclosed embodiment allows for estimating residue at a much lower computational cost than that associated with previously proposed techniques. The residue estimation and removal of the disclosed embodiment can be accomplished without extensive or complicated transform or convolution calculations. Instead, the disclosed example utilizes the property of the convolution of a signal with an impulse signal.

The convolution of a signal, $S(f)$ with an impulse, $\delta(f-f_0)$ is a shifted version of $S(f)$, which is given by $S(f-f_0)$. With the original signal spectrum $S(f)$ known, the shifted spectrum, $S(f-f_0)$ is known immediately and no additional computation is needed. The disclosed embodiment includes obtaining the residue estimate in this way.

A convolution with an impulse or delta function, $\delta(f-f_0)$ is of particular interest because the Fourier spectrum of an object of interest is given by a delta function, $\delta(f-f_0)$. The residue is given by the following equation, which uses the property of a discrete Fourier transform (DFT), $$R_f(k) = DFT\{code(n) \times s(n) \times Win(n)\} \quad \text{Equation 1}$$
$$= DFT\{code(n) \times Win(n)\} \otimes DFT\{s(n)\}$$
$$= code_f(k) \otimes S_f(k),$$

where $R_f(k)$ is the residue, $code_f(k)$ is the spectrum of the phase code, $S_f(k)$ is the spectrum of the radiation reflected from the object, k is the discrete Doppler index, and $\otimes$ is the convolution symbol.

The radiation reflected from an object is modeled in this example as a point target or single frequency complex signal. In this case, the spectrum of the received radiation, $S_f(k)$, is given by a delta function, $\delta(k-k_0)$. Then the residue in Equation 1 can be rewritten using the following equation.

$$R_f(k) = code_f(k) \otimes \delta(k-k_0) \quad \text{Equation 2}$$
$$= code_f(k-k_0).$$

It follows that the residue corresponding to one object is the cyclic shift of the spectrum of the code. If there are multiple objects, the residue is given by the sum of the cyclic shift of the code spectrum with different amounts of shift. This can be represented by the following relationship.

$$R_f(k) = \sum_i code_f(k) \otimes \alpha_i \delta(k-k_i) \quad \text{Equation 3}$$
$$= \sum_i \alpha_i code_f(k-k_i)$$

Delta functions like those included above are generally known and those skilled in the art who have the benefit of this description will realize how to configure or program a processor to utilize appropriate delta functions for their particular implementation.

One of the aspects of the disclosed embodiment is that all calculations and determinations are accomplished in the frequency domain. This approach avoids any need to convert between time and frequency domains. Additionally, the disclosed embodiment avoids using multiple FFTs and IFFTs between the time and frequency domains. A detecting device and method designed according to an embodiment of this invention requires less computation and processing capacity than other approaches. Instead, embodiments of this invention utilize the property of the frequency domain convolution and the point-target property of radiation reflected from an object to estimate the residue. By reducing computational complexity, the benefits of MIMO signaling techniques become more readily available for automobile detector arrangements without the drawbacks that otherwise accompany MIMO processing.

The preceding description is exemplary rather than limiting in nature. For example, two transmitter elements and one receiver element are shown but other numbers of each type of component may be used. Additionally, more transmissions and more codes may be used. Variations and modifications to the disclosed examples may become apparent to those skilled in the art that do not necessarily depart from the essence of this invention. The scope of legal protection given to this invention can only be determined by studying the following claims.

I claim:
1. A detector device, comprising:
    at least one receiver configured to receive radiation comprising a plurality of codes, each of the codes being associated with one of a plurality of transmissions, each of the codes being distinct from the other codes; and
    a processor that is configured to
        obtain information corresponding to a predetermined phase code spectrum for the codes;
        determine a demodulated signal spectrum of radiation received by the at least one receiver;
        determine at least one preselected characteristic of the determined demodulated signal spectrum, wherein the at least one preselected characteristic of the determined demodulated signal spectrum is determined by determining at least a frequency value corresponding to a location of at least one peak in the determined demodulated signal spectrum of the received radiation;
        adjust the predetermined phase code spectrum based on the determined characteristic to generate an adjusted phase code spectrum; and refine the determined demodulated signal spectrum based on the adjusted phase code spectrum to generate a refined demodulated signal spectrum.

2. The detector device of claim 1, wherein the processor is configured to identify or locate at least one object of interest based on the refined demodulated signal spectrum.

3. The detector device of claim 2, wherein the refined demodulated signal spectrum includes at least one peak corresponding to the at least one object of interest.

4. The detector device of claim 1, wherein the processor is configured to adjust the predetermined phase code spectrum by shifting the predetermined phase code spectrum by an amount corresponding to the determined frequency value.

5. The detector device of claim 4, wherein the processor is configured to refine the determined demodulated signal spectrum by subtracting the adjusted phase code spectrum from the determined demodulated signal spectrum.

6. The detector device of claim 1, wherein the refined demodulated signal spectrum comprises a difference between the adjusted phase code spectrum and the determined demodulated signal spectrum.

7. The detector device of claim 1, wherein there is a respective predetermined phase code spectrum for each of the plurality of codes.

8. The detector device of claim 1, wherein the processor is configured to further refine the determined demodulated signal spectrum by
determining refined information regarding the preselected at least one characteristic in the refined demodulated signal spectrum;
adjusting the predetermined phase code spectrum based on the determined refined information to generate a refined adjusted phase code spectrum; and
refining the refined demodulated signal spectrum based on the refined adjusted phase code spectrum.

9. The detector device of claim 1, wherein the adjusted phase code spectrum corresponds to a residue in the received radiation.

10. A method of detecting using information regarding a predetermined phase code spectrum corresponding to a plurality of codes, each of the codes being distinct from the other codes, the method comprising:
receiving radiation comprising the plurality of codes;
determining a demodulated signal spectrum of the received radiation;
determining at least one preselected characteristic of the determined demodulated signal spectrum, wherein determining the at least one preselected characteristic comprises determining information regarding at least one peak in the determined demodulated signal spectrum and determining at least a frequency value corresponding to a location of at least one peak in the determined demodulated signal spectrum of the received radiation;
adjusting the predetermined phase code spectrum based on the determined characteristic to generate an adjusted phase code spectrum; and
refining the determined demodulated signal spectrum based on the adjusted phase code spectrum to generate a refined demodulated signal spectrum.

11. The method of claim 10, comprising identifying or locating at least one object of interest based on the refined demodulated signal spectrum.

12. The method of claim 11, wherein the refined demodulated signal spectrum includes at least one peak corresponding to the at least one object of interest.

13. The method of claim 10, wherein adjusting the predetermined phase code spectrum comprises shifting the predetermined phase code spectrum by an amount corresponding to the determined frequency value.

14. The method of claim 13, wherein refining the determined demodulated signal spectrum comprises subtracting the adjusted phase code spectrum from the determined demodulated signal spectrum.

15. The method of claim 10, wherein the refined demodulated signal spectrum comprises a difference between the adjusted phase code spectrum and the determined demodulated signal spectrum.

16. The method of claim 10, wherein the predetermined phase code spectrum includes respective phase code spectrums for each of the plurality of codes.

17. The method of claim 10, comprising further refining the determined demodulated signal spectrum by
determining refined information regarding the characteristic of the refined demodulated signal spectrum;
adjusting the predetermined phase code based on the determined refined information to generate a refined adjusted phase code spectrum; and
refining the refined demodulated signal spectrum based on the refined adjusted phase code spectrum.

18. The method of claim 10, wherein the adjusted phase code spectrum corresponds to a residue in the received radiation.

* * * * *